April 26, 1927.  1,626,537
B. JIROTKA
VARIABLE CONDENSER
Filed April 15, 1926
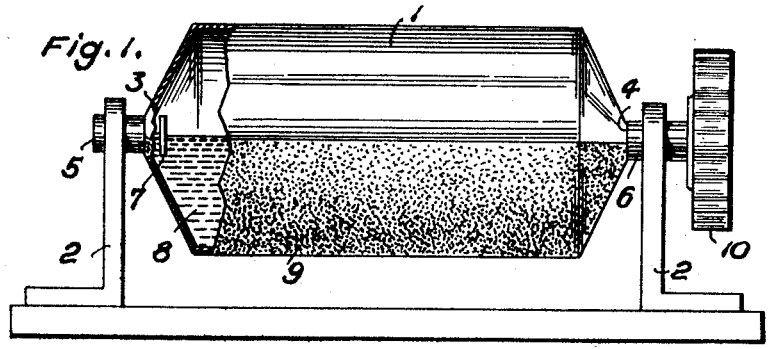
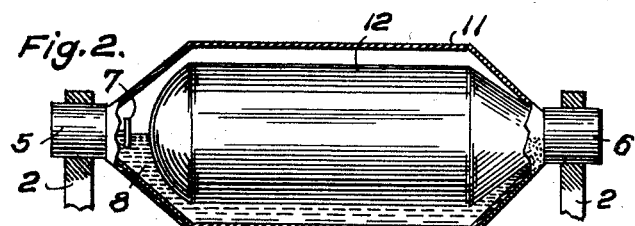
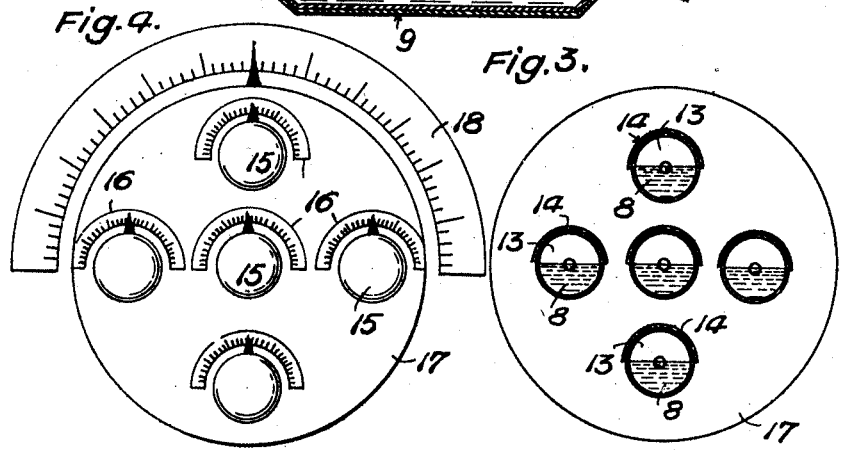
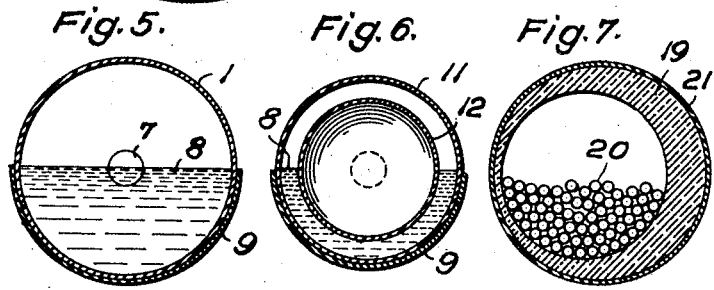
Inventor
Bohumil Jirotka.
By William C. Linton.
Attorney.

Patented Apr. 26, 1927.

1,626,537

UNITED STATES PATENT OFFICE.

BOHUMIL JIROTKA, OF BERLIN, GERMANY, ASSIGNOR TO THE FIRM, DR. OTTO SPRENGER, PATENTVERWERTUNG JIROTKA MIT BESCHRÄNKTER HAFTUNG, OF VADUZ, LICHTENSTEIN.

VARIABLE CONDENSER.

Application filed April 15, 1926, Serial No. 102,271, and in Germany April 25, 1925.

The object of the present invention is a variable condenser, the essential characteristic of which consists in that one plate of the condenser is formed by a movable body contained within a tubular vessel which is rotatable about its longitudinal axis, while the other plate is formed on the external surface of the tubular vessel. The movable body within the tubular vessel may consist either of a conducting liquid, for example, mercury or an electrolyte, or of small solid bodies which are conductors, for example, carbon or metal pellets, which partly fill the tubular vessel. The outer plate may be formed of metal, for example, of a coating of tin-foil or silver and so forth.

The hollow vessel containing the movable body may be formed as a double-walled container, in which the movable body is located between the two walls, or as a container with unequal thickness of the walls.

Several of these condensers can be assembled together to form a battery, the elements of which can be rotated either separately or simultaneously.

In the drawings several constructional examples of the invention are represented:

Fig. 1 shows a partly sectional longitudinal elevation of a tubular condenser.

Fig. 2 a similar view of a double-walled tubular condenser.

Fig. 3 a battery of condensers in cross section, and,

Fig. 4 in end elevation.

Fig. 5 is a cross section corresponding to Fig. 1.

Fig. 6 a cross section corresponding to Fig. 2.

Fig. 7 shows a tubular condenser having an unequal thickness of wall.

Referring to the drawings, Figs. 1 and 5 show a hollow tubular glass vessel which contains a conducting liquid 8, and which is provided externally over about half its surface with a conducting coating 9 of metal. The tubular glass vessel 1 ends in the necks 3, 4, which are sealed at the ends. The pins 3, 4, are located within hollow metal sleeves 5, 6 which are cemented in place. The metal sleeve 5 is connected with an electrode 7, which is continually in contact with the conducting liquid 8. The cap 6 on the other hand is connected with the outer coating 9.

The glass vessel 1 serves as the dielectric and as the support for the conducting layers.

If now, for example, the glass vessel, which is rotatably mounted in the supports 2, is rotated, the part provided with the conducting coating 9 changes its position with relation to the conducting liquid 8 within and the capacity becomes smaller. By the rotation of the vessel 1 the capacity can be varied as desired. The rotation can be effected, for example, by means of a handle 10, or in some other manner.

Instead of the conducting liquid 8, solid movable bodies, for example, fragments of carbon or metal pellets, metal scrap or strips and so forth can also be provided in the glass vessel 1. The latter can further be exhausted of air or filled with gas.

In the constructional form according to Figs. 2 and 6, the variable condenser consists of two glass vessels 11 and 12. The inner vessel 12 serves only as a packing vessel and is provided so that the inner conductor body 6 is not too large in quantity or weight, which is the chief objection when heavy conducting liquids, for example, mercury or such like conductor bodies are used. In this construction the conducting liquid or such-like conductor body is located only between the walls of the vessels 11 and 12 and reaches up to the electrode 7.

In Figs. 3 and 4 several single condensers 13, which contain a conducting liquid 8 or such-like movable body, and which are provided externally with a conductor coating 14, are so assembled as a battery, that they can be regulated either singly or simultaneously by simple rotation. In Fig. 4, 15 denotes the handles of the separate condensers 13, their respective scales 16 being located above. The condensers 13 are mounted in a common container 17, which may enclose the condensers as a casing. By means of the container 17 the assembled condensers can all be rotated together, for which purpose the common scale 18 is provided whilst the condensers 13 can also be rotated separately and independently of one another by means of the handles 15.

Fig. 7 is a section through a hollow vessel 19, the capacity of which can be regulated, that is to say, varied, by the variation of the dielectric. The hollow vessel is provided for this purpose with a wall of unequal thickness. If the vessel 19 is rotated so that the thicker part of the wall comes underneath, the capacity is smaller, whilst, if the thinner part of the wall is underneath the capacity is greater. The hollow vessel 19 may in this case be made of glass and be provided over its whole outer surface with a conductor coating 21. 20 is a filling of loose carbon or metal pellets.

I claim:

1. A variable condenser comprising a vessel partially filled with a conducting liquid and having closed ends terminating into necks, an electrode passed through one of said necks and submerged in said conducting liquid and a metallic coating for a predetermined portion of the exterior surface of said vessel.

2. A variable condenser comprising a vessel partially filled with a conducting liquid and having closed ends terminating into necks, a metal sleeve on each neck, an electrode submerged in said conducting liquid and connected to one of said sleeves, a metallic coating for the vessel and electrically connected to the other of said sleeves, and a pair of posts rotatably supporting said sleeves.

3. A variable condenser comprising a vessel partially filled with a conducting liquid and having closed ends terminating into necks, a metal sleeve on each neck, an electrode submerged in said conducting liquid and connected to one of said sleeves, a metallic coating for the vessel and electrically connected to the other of said sleeves, a pair of posts rotatably supporting said sleeves, and means in said vessel for determining the depth and distribution of said conducting liquid.

4. A variable condenser comprising a vessel partially filled with a conducting liquid and having closed ends terminating into necks, an electrode passed through one of said necks and submerged in said conducting liquid, a metallic coating for the predetermined portion of the exterior surface of said vessel, and a second vessel submerged in said conducting liquid for controlling the depth and distribution of the conducting liquid.

In witness whereof I have hereunto set my hand.

BOHUMIL JIROTKA.